Feb. 17, 1953 — C. E. CUSHMAN — 2,628,855
COUPLING FOR CONTROL CABLES
Filed Oct. 23, 1950
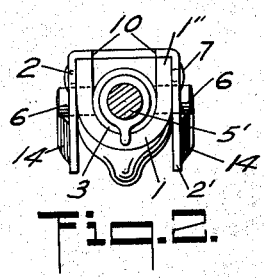
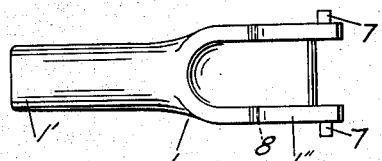
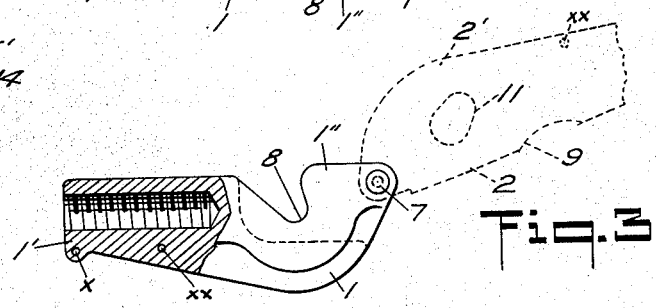
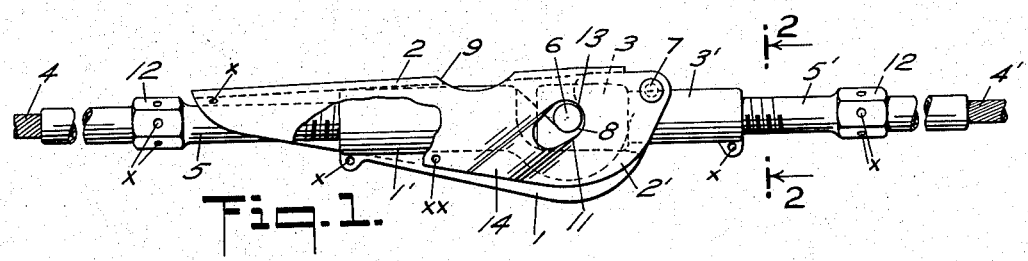
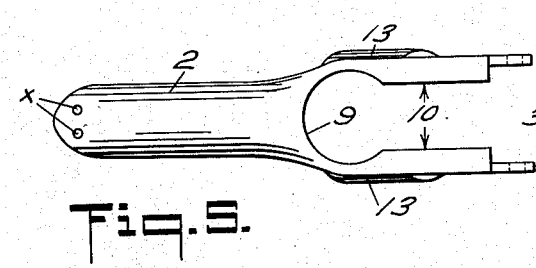
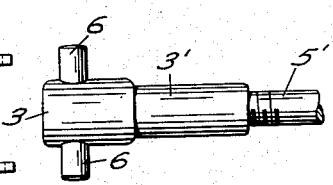
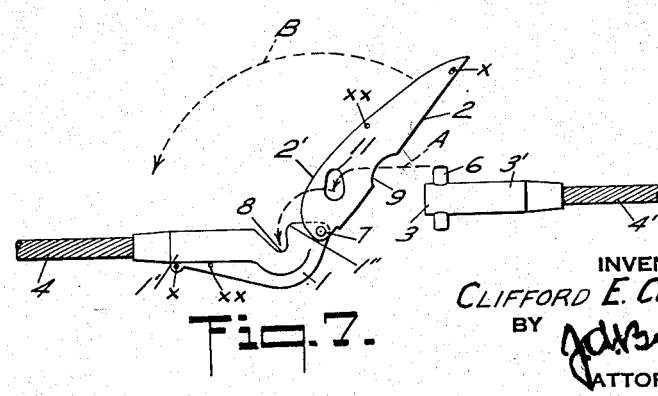
INVENTOR
CLIFFORD E. CUSHMAN
BY
ATTORNEY Patented Feb. 17, 1953

2,628,855

UNITED STATES PATENT OFFICE 2,628,855

COUPLING FOR CONTROL CABLES

Clifford E. Cushman, Burbank, Calif., assignor to Sturgess Inc., Glendale, Calif., a corporation of California Application October 23, 1950, Serial No. 191,714

5 Claims. (Cl. 287—76)

This invention relates to quick detachable couplings as chiefly used for aircraft control cables, and the principal objects of the invention are to provide improvements in such a device which combine extreme simplicity, ease of operation, safety, no free or loseable parts, and such a device which can take the place of a turnbuckle also if desired. Particular features of the improvement will appear in the following description and the accompanying drawings.

In the drawings

Fig. 1 is a side view of the improved coupling completely assembled to include a turnbuckle, and with the hand lever closed and part of it broken away to reveal the body member of the coupling.

Fig. 2 is an end view of the device as seen from the line 2—2 of Fig. 1.

Fig. 3 is a detached side view of the body member, with the handle dotted in open position.

Fig. 4 is a plan view of the body member.

Fig. 5 is a plan view of the handle.

Fig. 6 is a detached plan view of the T-shaped cable terminal.

Fig. 7 is a diagrammatic side elevation of the complete coupling and cables showing the handle in open position and one of the cable terminals released with dotted lines indicating the mode of reassembly.

In further detail the coupling proper comprises but three pieces, a body 1, permanently pivoted to a hand lever or "handle" 2 and a special cable terminal member 3.

The body 1 and terminal 3 are provided with tubular shanks 1' and 3' respectively for receiving the end of a cable 4 and 4' either by direct swaging thereto as indicated in Fig. 7 or through the intermediary of turnbuckle rods 5 and 5' right and left threaded into the tubular shanks as indicated in Fig. 1.

Terminal member 3 is provided at its free end with a transverse pin or trunnions 6 projecting from opposite sides for engagement with the hand lever and with the body.

The body is roughly hook shaped and its end remote from the shank is widened and provided with spaced walls 1'' each formed with a slightly hooked recess or seat 8 to receive the cross pin or trunnions 6 of terminal member 3 while at the extreme ends of the walls 1'' are pivots or trunnions 7 over which the hand lever 2 is pivoted and the ends of the trunnions peened over.

The hand lever is preferably of sheet metal of channel cross section widening out toward its pivoted end with deepened side walls 2' to straddle the walls 1'' of the body, and the connecting portion of the channel is cut away from the wide end to the point 9 to provide a clear open space extending through the channel and with the edges 10 bent inwardly to form a guide for the shank 3' of the terminal member 3, while in the sides or deep walls of the channel are openings 11 to receive the trunnions 6 of member 3 and which may be inserted through the back of the hand lever or "outer side," when the lever is swung to open position.

To easily insert the terminal 3 with its trunnions 6 into the hand lever, the lever is swung to the position shown in Fig. 7 and the terminal is turned to bring the trunnions into line with the open passage between the guides 10 of the lever (as also shown in Fig. 7) and it is advanced through the passage in the lever to bring the trunnions opposite the openings 11 (as indicated by the dotted line A), then the member is turned and tilted slightly if necessary to get the trunnions to enter the wall openings, until the trunnions extend at right angles to the walls and are seated in the bottom of the openings. After this the lever is swung to the left along dotted line B in contact with the shank 1' of the body and wired or cotter pinned in place.

By the operation above described the terminal trunnions will be carried toward the opposite end of the coupling and forced into the recess or seat 8 of the body and the initial tension of the line will be reestablished.

If the coupling assembly should include the turnbuckle units 5—5' the tension of the cable may be adjusted as desired by turning the assembly bodily while holding the hex portions 12 of the turnbuckles with a suitable double wrench, tho it will be easier to make such adjustments with the tension of the cable slackened off by opening the hand lever to substantially at right angles to the line and then using the lever as a handle to bodily revolve the assembly, then close the handle and check the tension with a tensiometer, repeating this as may be necessary.

The lever, body, terminal member, and turnbuckle hexes are drilled as at X for safety wiring in adjusted and closed position, and for a cotter pin for the lever at XX, all as well understood in the art.

It should be noted that the openings 11 in the side walls of the lever which receive and form a transitory seat for carrying the trunnions of the terminal member 3 to the hooklike recess 8 of the body, are preferably slots slanted cross wise of the lever as shown on the drawings to give a cam-like action in forcing the trunnions into and out of the body recess seat, and are preferably of a size to entirely clear the pressure side of the trunnions so that all of the cable tension will be transmitted directly through the body member only, and not through the lever which functions only as a power amplifier to force the trunnions in and out of its body seat. This clearance is shown in the drawing Fig. 1 at 13. Also to be noted is that the walls of the lever may be bulged outward slightly as at 14 in the drawing to permit easier entry of the trunnions into the slots or removal therefrom as the terminal member is turned.

Having thus described the improved construction in a coupling for control cables, and the manner of its operation, what I claim is:

1. A cable coupling comprising a body member adapted to receive a first cable terminal at one end, and a hand lever pivoted at the other end to swing from a closed position longitudinally of and against the body to an open position projecting outward thereof, and a second cable terminal provided with an enlarged free end, said body and lever formed with spaced walls providing a free passage extending through the lever where pivoted, a seat formed on the inner side of the body to receive the enlarged end of said second cable terminal, and a seat in said lever adjacent its pivotal point to receive and hold said enlarged end, accessible thereto after being passed through the space between the lever walls from the outer side of the lever when in opened out position, and whereby the closing of the lever will force the enlarged end of the terminal into the seat of the body.

2. A cable coupling comprising a body member adapted to receive a first cable terminal at one end, and a hand lever pivoted at the other end to swing from a closed position longitudinally of and against the body to an open position projecting outward thereof, and a second cable terminal provided with a T-shaped free end, said body and lever formed with spaced walls providing a free passage extending through the lever where pivoted, a seat formed in the walls of the body to receive the T-shaped end of said second cable terminal, and openings in said lever walls adjacent its pivotal point to receive and hold said T-shaped end, accessible thereto after being passed through the space between the lever walls from the outer side of the lever when in opened out position, and whereby the closing of the lever will force the T-shaped end of the terminal into the seat of the body.

3. In a structure as set out in claim 2 said second cable terminal being a shank member with the cross arm of the T projecting as trunnions from opposite sides.

4. In a structure as set out in claim 2 said openings in the spaced walls of the lever being of a size to be free of the T-shaped end of the second cable terminal when seated in the seat formed in the walls of the body.

5. In a structure as set out in claim 2 the seat formed on the inner side of the body being a hook shaped recess, and said openings in the hand lever walls being slots angularly disposed to provide a cam action in forcing the T-shaped end of the terminal out of the seat in moving the hand lever to open position.

CLIFFORD E. CUSHMAN.

REFERENCES CITED

The following references are of record in the file of this patent:

UNITED STATES PATENTS

| Number | Name | Date |
|---|---|---|
| 721,427 | Cope | Feb. 24, 1903 |
| 1,498,827 | Wiswell | June 24, 1924 |
| 2,359,492 | Rockwood | Oct. 3, 1944 |

FOREIGN PATENTS

| Number | Country | Date |
|---|---|---|
| 68,487 | Austria | Apr. 26, 1915 |